United States Patent
Nakao et al.

(10) Patent No.: US 9,941,637 B2
(45) Date of Patent: Apr. 10, 2018

(54) CONNECTION DEVICE

(71) Applicant: Panasonic Intellectual Property Management Co., Ltd., Osaka (JP)

(72) Inventors: Shuhei Nakao, Osaka (JP); Tetsuhiro Kaya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/429,298

(22) Filed: Feb. 10, 2017

(65) Prior Publication Data

US 2018/0006402 A1 Jan. 4, 2018

(30) Foreign Application Priority Data

Jul. 4, 2016 (JP) .................................. 2016-132125
Jan. 17, 2017 (JP) .................................. 2017-005554

(51) Int. Cl.
*H01R 13/62* (2006.01)
*H01R 13/639* (2006.01)
*B64D 11/06* (2006.01)

(52) U.S. Cl.
CPC ..... *H01R 13/6395* (2013.01); *B64D 11/0624* (2014.12); *B64D 11/0646* (2014.12)

(58) Field of Classification Search
CPC ........ H01R 13/6395; B64D 2045/0035; B64D 2045/004
See application file for complete search history.

(56) References Cited

U.S. PATENT DOCUMENTS

| | | | |
|---|---|---|---|
| 6,030,229 A | 2/2000 | Tsutsui | |
| 7,097,461 B2 * | 8/2006 | Neidlein | H01R 13/6205 439/39 |
| 7,351,066 B2 * | 4/2008 | DiFonzo | H01R 13/641 439/39 |
| 9,647,385 B2 * | 5/2017 | Suh | H01R 13/6205 |
| 2003/0202005 A1 | 10/2003 | Sadahiro | |
| 2005/0208783 A1 | 9/2005 | Suzuki et al. | |
| 2007/0072443 A1 * | 3/2007 | Rohrbach | H01R 13/6205 439/39 |
| 2015/0024611 A1 * | 1/2015 | Wilkolaski | H01R 13/6205 439/39 |

FOREIGN PATENT DOCUMENTS

| | | |
|---|---|---|
| JP | 10-255894 | 9/1998 |
| JP | 2003-317455 | 11/2003 |
| JP | 2005-267943 | 9/2005 |
| JP | 2012-088312 | 5/2012 |

* cited by examiner

*Primary Examiner* — Xuong Chung Trans
(74) *Attorney, Agent, or Firm* — McDermott Will & Emery LLP

(57) ABSTRACT

A connection device in the present disclosure, which is a connection device capable of detachably connecting a cable, includes a first terminal to be connected to a second terminal of the cable, a holding mechanism for maintaining a connection state between the first terminal and the second terminal, and a controller that acquires environment information around the connection device and changes holding force of the holding mechanism based on the environment information.

15 Claims, 6 Drawing Sheets

CONNECTION DEVICE

BACKGROUND

1. Field

The present disclosure is related to a connection device capable of connecting a cable.

2. Description of the Related Art

Patent Literature 1 discloses a cable connection mechanism in which a cable removal button is pressed to perform pre-processing for removing a cable and, after the removal pre-processing is completed, a cable lock is released and the cable can be removed. This structure makes it possible to attach and detach a cable only in a safe state.

CITATION LIST

Patent Literature

PTL 1: Unexamined Japanese Patent Publication No. 2012-88312

SUMMARY

The present disclosure provides a connection device that reduces disconnection of a cable and possible breakage of a connector.

A connection device in the present disclosure, which is a connection device capable of detachably connecting a cable, includes a first terminal to be connected to a second terminal of the cable, a holding mechanism for maintaining a connection state between the first terminal and the second terminal, and a controller that acquires environment information around the connection device and changes holding force of the holding mechanism based on the environment information.

The connection device in the present disclosure is effective in reducing disconnection of a cable and possible breakage of a connector.

DETAILED DESCRIPTION OF THE PREFERRED EMBODIMENTS

Hereinafter, exemplary embodiments will be described in detail with reference to the drawings as necessary. Description that is in more detail than necessary is occasionally omitted. For example, detailed description about already well-known matters and overlapped description about the substantially same configurations are occasionally omitted. This is because the following description is avoided from being unnecessarily redundant, and a person skilled in the art is made to easily understand the present disclosure.

The accompanying drawings and the following description are provided for a person skilled in the art to fully understand the present disclosure, and do not intend to limit the subject matter described in claims.

First Exemplary Embodiment

Hereinafter, a first exemplary embodiment will be described with reference to FIGS. 1 to 6.

[1-1 Structure]

Figure 1:
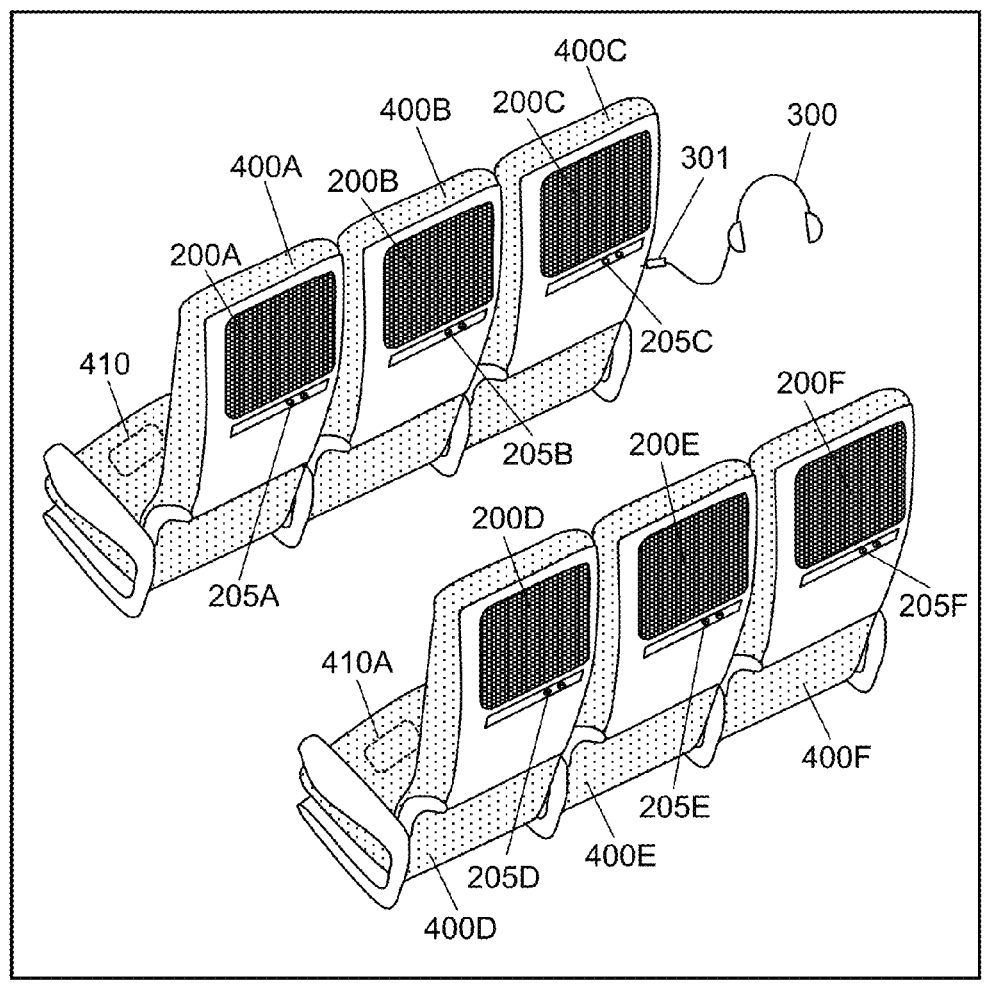
FIG. 1 is a view showing arrangement of in-flight monitors provided within an airplane in a first exemplary embodiment.

FIG. 1 is a view showing arrangement of in-flight monitors 200A to 200F provided within an airplane in the first exemplary embodiment. A plurality of seats 400A to 400F for passengers to sit down thereon are provided within the airplane. In-flight monitors 200A to 200F are disposed in seats 400A to 400F, respectively. Each of in-flight monitors 200A to 200F has the same structure. Hereinafter, in-flight monitors 200A to 200F may be collectively referred to as in-flight monitor 200. Seats 400A to 400F may be collectively referred to as seat 400.

Each of in-flight monitors 200A to 200F is provided at a predetermined position on a back side of a backrest of each of seats 400A to 400F. That is, in-flight monitor 200 is provided at a position that faces a passenger who occupies a seat (rear seat) behind the seat equipped with in-flight monitor 200 in the state where the passenger can recognize in-flight monitor 200 visually. Herein, in-flight monitor 200 corresponding to seat 400 means in-flight monitor 200 to be use by the passenger (passenger to whom seat 400 is assigned) who occupies rear seat 400. In other words, in-flight monitor 200 corresponding to seat 400 means in-flight monitor 200 disposed on a back side of a backrest of seat 400 disposed in front of rear seat 400. In the example shown in FIG. 1, in-flight monitor 200A corresponds to seat 400D. Conversely, seat 400 corresponding to in-flight monitor 200 means seat 400 (seat 400 assigned to a passenger) occupied by the passenger who uses in-flight monitor 200.

In-flight monitors 200A to 200F, as shown in FIG. 1, include I/O interfaces (I/F) 205A to 205F, respectively. I/O interfaces 205A to 205F may be collectively referred to as I/O interface 205. A passenger, who occupies rear seat 400 assigned to the passenger, operates a touch panel (described below) of in-flight monitor 200 corresponding to rear seat 400, i.e., in-flight monitor 200 provided in front of rear seat 400, or views audio-visual contents outputted from in-flight monitor 200, thereby enabling the passenger to receive various kinds of in-flight services.

Further, the passenger is allowed to connect plug 301 of his/her own headphone 300 to I/O interface 205 of in-flight monitor 200 to receive in-flight music service through headphone 300.

Seat sensor 410 is disposed at a predetermined position in a seating section of seat 400. For example, in FIG. 1, seat sensor 410A is disposed in a seating section of seat 400D. Likewise, seat sensors 410B and 410C, which are not shown in FIG. 1, are disposed in seats 400E and 400F. Seat sensors 410A to 410F, which include seat sensors 410D to 410F described later, may be collectively referred to as seat sensor 410. Seat sensor 410 detects a state whether a seat is occupied or unoccupied by a passenger, and outputs the state of the seat as seating information. That is, seat sensor 410 outputs either an occupied signal, which indicates that the seat is occupied by a passenger, or an unoccupied seat signal, which indicates that the seat is unoccupied, as seating information. The seat sensor is constituted by, for example, a pressure sensor. The seat sensor outputs an ON signal (occupied signal) when detecting a pressure more than or equal to a fixed level, and outputs an OFF signal (unoccupied signal) when detecting a pressure less than the fixed level.

Figure 2:
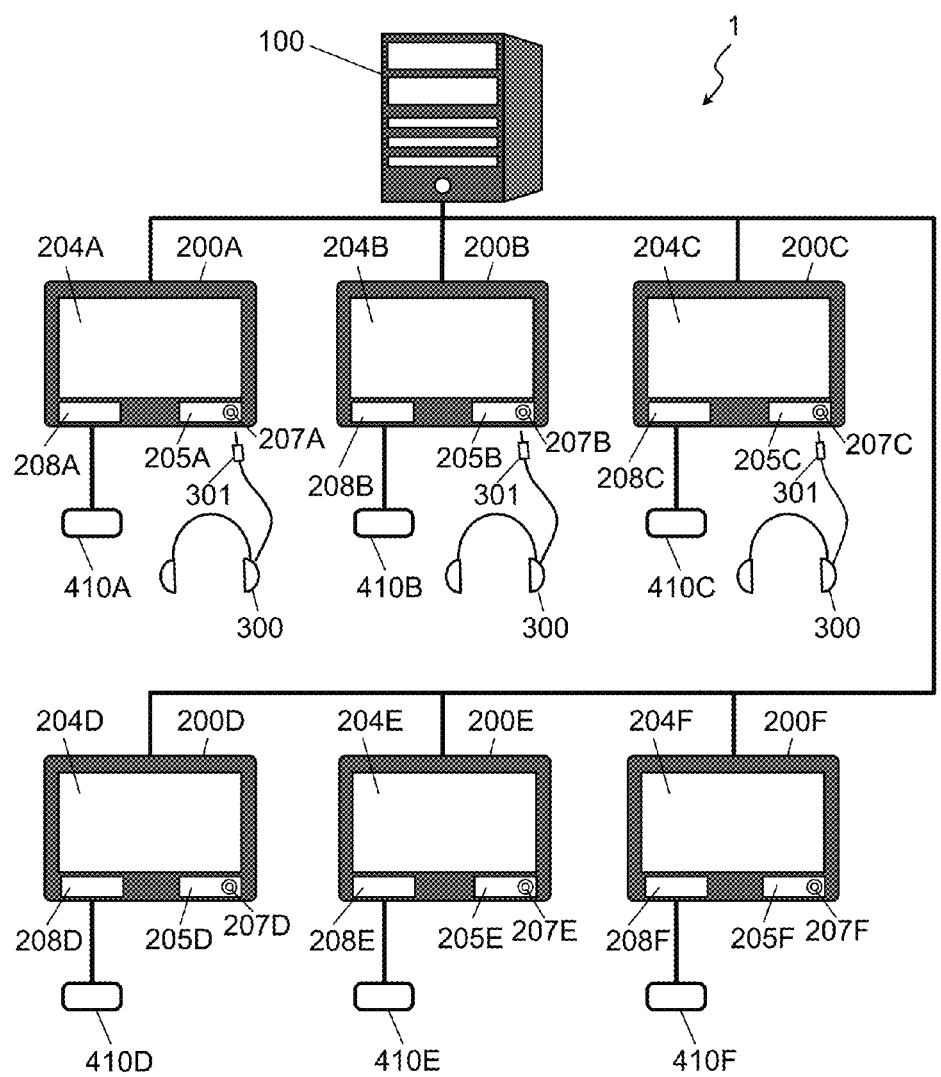
FIG. 2 is a view showing a configuration of an in-flight system in the first exemplary embodiment.

FIG. 2 is a view showing a configuration of in-flight system 1. In-flight system 1 includes server 100 and in-flight monitors 200A to 200F. Server 100 is connected to in-flight monitors 200A to 200F through a network cable, and performs bidirectional communications, i.e., delivers contents, acquires sensor information from in-flight monitor 200, and the like.

In-flight monitor 200 is attached to each seat 400 of an airplane and serves as a connection device including a display monitor (display). In-flight monitor 200 can play contents delivered from server 100 and connect with external devices such as headphone 300, for example. In-flight monitors 200A to 200F include touch panels 204A to 204F, I/O interfaces 205A to 205F, and sensor input interfaces (I/F) 208A to 208F, respectively. Touch panels 204A to 204F may be collectively referred to as touch panel 204. Sensor input interfaces 208A to 208F may be collectively referred to as sensor input interface 208.

In-flight monitors 200A to 200F are connected to seat sensors 410A to 410F, respectively. Herein, as mentioned above, seat sensor 410A is disposed in seat 400D. That is, seat sensor 410A connected to in-flight monitor 200A is disposed in seat 400D, which corresponds to in-flight monitor 200A. Accordingly, seat sensor 410A detects whether or not seat 400D is occupied by the passenger who uses in-flight monitor 200A.

Headphone 300 includes a cable. Further, headphone 300 includes plug 301 at a tip end of the cable as a connecting terminal. The cable (plug 301) of headphone 300 is detachably connected to in-flight monitor 200. That is, plug 301 provided at the tip end of the cable of headphone 300 is connected to I/O interface 205 of in-flight monitor 200, so that headphone 300 can output audio sounds according to audio signals outputted from I/O interface 205 of in-flight monitor 200.

Further, as shown in FIG. 2, I/O interfaces 205A to 205F include holding mechanisms 207A to 207F, respectively. Holding mechanisms 207A to 207F may be collectively referred to as holding mechanism 207. A connection state between plug 301 of headphone 300 and I/O interface 205 is maintained mechanically by holding mechanism 207. Holding mechanism 207 will be described later in detail.

Figure 3:
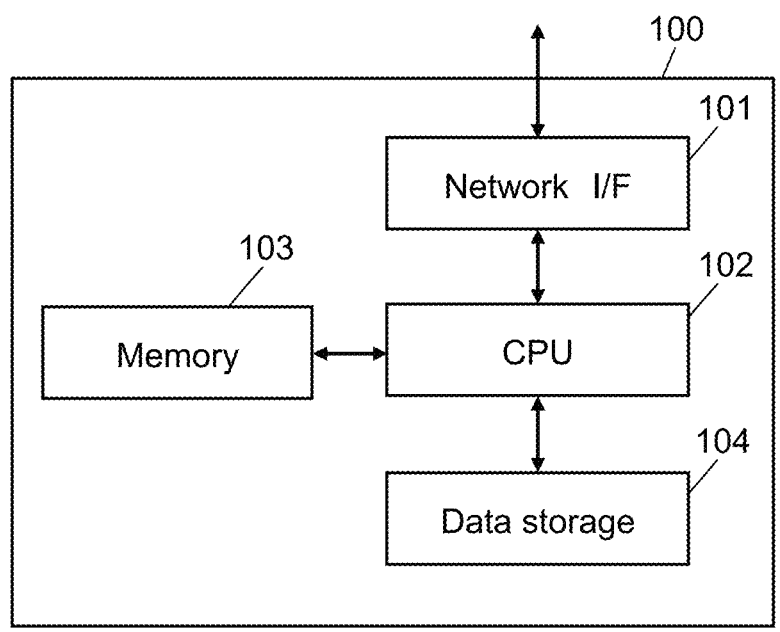
FIG. 3 is a view showing a configuration of a server in the first exemplary embodiment.

FIG. 3 is a view showing a configuration of server 100. Server 100 includes network interface (I/F) 101, CPU 102, memory 103, and data storage 104. Network interface 101 is an interface for causing CPU 102 to perform communication through in-flight monitor 200 and a network cable.

CPU 102 executes a program stored in memory 103 described later, and performs various kinds of computing operations and information processing. CPU 102 can perform reading and writing operations with respect to memory 103 or data storage 104. CPU 102 communicates with in-flight monitor 200 via network interface 101. CPU 102 reads out contents stored in data storage 104 and delivers them to in-flight monitor 200, according to demands from in-flight monitor 200.

Memory 103 stores a program to be executed by CPU 102 and a calculation result of CPU 102. Memory 103 is constituted by a flash memory or RAM. Data storage 104 stores contents to be delivered to in-flight monitor 200, and information on a position of I/O interface 205 provided in each in-flight monitor 200 within an airplane. Data storage 104 is constituted by a hard disk, a flash memory, or the like, and stores contents including image contents and audio contents.

Figure 4:
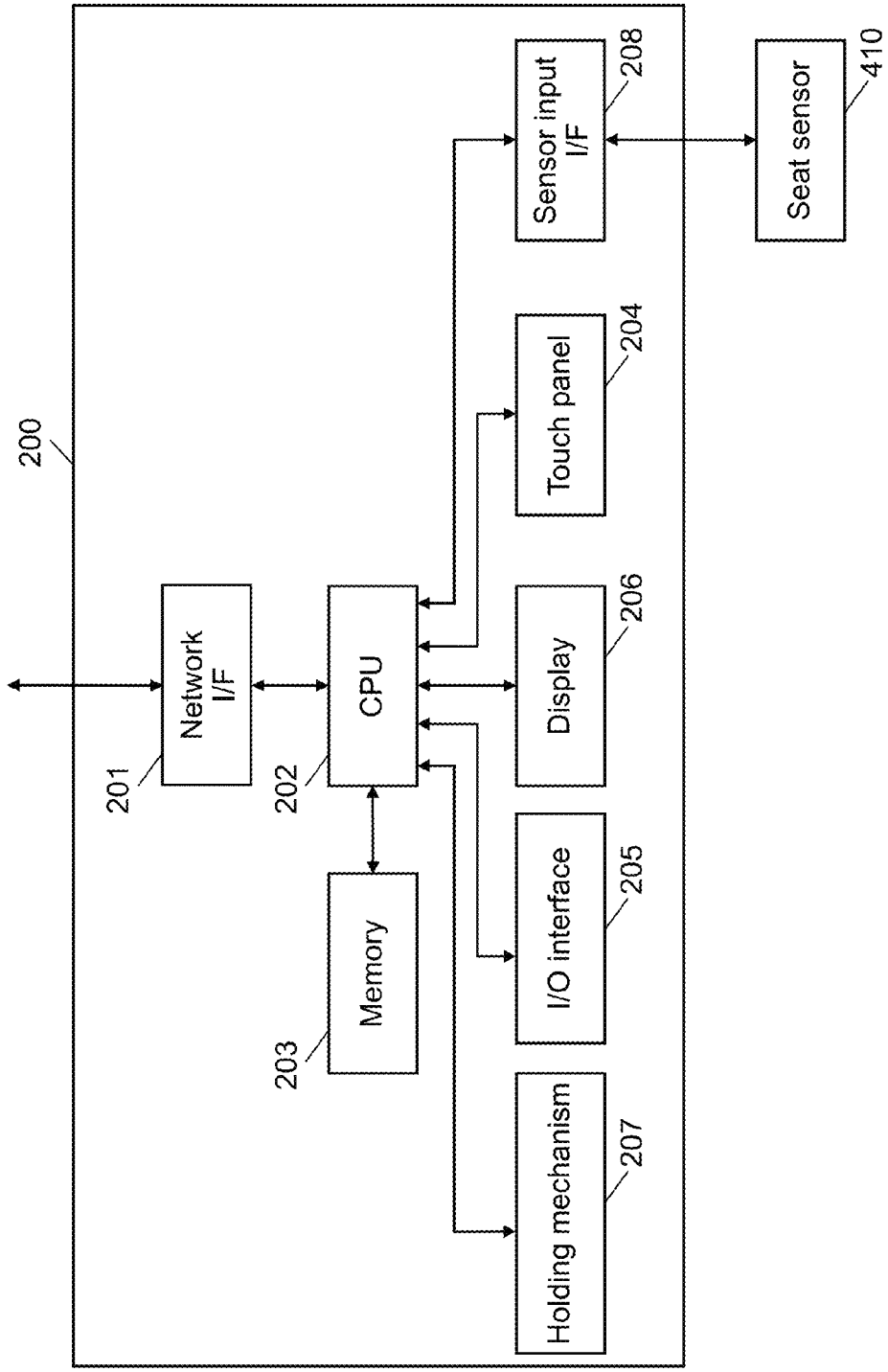
FIG. 4 is a view showing a configuration of the in-flight monitor in the first exemplary embodiment.

FIG. 4 is a view showing a configuration of in-flight monitor 200. In-flight monitor 200 includes network interface (I/F) 201, CPU 202, memory 203, touch panel 204, I/O interface 205, display 206, holding mechanism 207, and sensor input interface 208. Network interface 201, CPU 202, and memory 203 may be constituted by the same hardware as network interface 101, CPU 102, and memory 103, each of which is built in server 100.

By executing the program stored in memory 203, CPU 202 can operate as an image playing part and an audio playing part, i.e., play the contents received from server 100. Further, by executing the program stored in memory 203, CPU 202 can cause in-flight monitor 200 to function as a video and audio player, i.e., play the contents received from server 100.

Touch panel 204 is disposed on a surface of display 206. When a passenger touches a display on display 206, touch panel 204 transmits information indicating the touched position to CPU 202. CPU 202 performs control in response to this, thereby enabling the passenger to perform operation intuitively.

I/O interface 205 is an audio jack for connecting with headphone 300. I/O interface 205 connects with plug 301 of headphone 300 and holds it. I/O interface 205 can detect whether or not headphone 300 is connected, i.e., plug 301 is inserted. When connecting with headphone 300, I/O interface 205 outputs a detection signal to CPU 202. I/O interface 205 is disposed at a specific position in in-flight monitor 200. In the present exemplary embodiment, I/O interface 205 is disposed on the back of a backrest of seat 400 like in-flight monitor 200.

When headphone 300 is connected to I/O interface 205, I/O interface 205 outputs various kinds of audio contents to headphone 300 according to commands from CPU 202. Display 206 displays various kinds of image contents according to commands from CPU 202.

Holding mechanism 207 is a mechanism for maintaining a connection state between I/O interface 205 and plug 301 of headphone 300 mechanically. Holding mechanism 207 receives a command from CPU 202, and then causes I/O interface 205 to adjust a holding force that holds plug 301. Holding mechanism 207 can adjust the holding force in three stages of "weak", "medium", and "strong." Holding mechanism 207 has a flat spring that sandwiches plug 301 of headphone 300 inserted into I/O interface 205 from both sides, and is a mechanism for changing a position at which the flat spring sandwiches plug 301 of headphone 300. By changing the position of the flat spring serving as a holding member, holding mechanism 207 changes a pressing force of the flat spring against the plug of headphone 300, so that the holding force that holds plug 301 is adjusted in the three stages.

Seating information on seat 400 is inputted to sensor input interface 208 from seat sensor 410 disposed outside in-flight monitor 200. The seating information inputted to sensor input interface 208 is transmitted to CPU 202.

In-flight monitor 200 is an example of the connection device. I/O interface 205 is an example of the first terminal. CPU 202 is an example of the controller. Headphone 300 is an example of the external device. Plug 301 of headphone 300 is an example of the second terminal. Seating information is an example of the environment information around the connection device. An airplane is an example of transport equipment.

[1-2 Operation]

Figure 5:
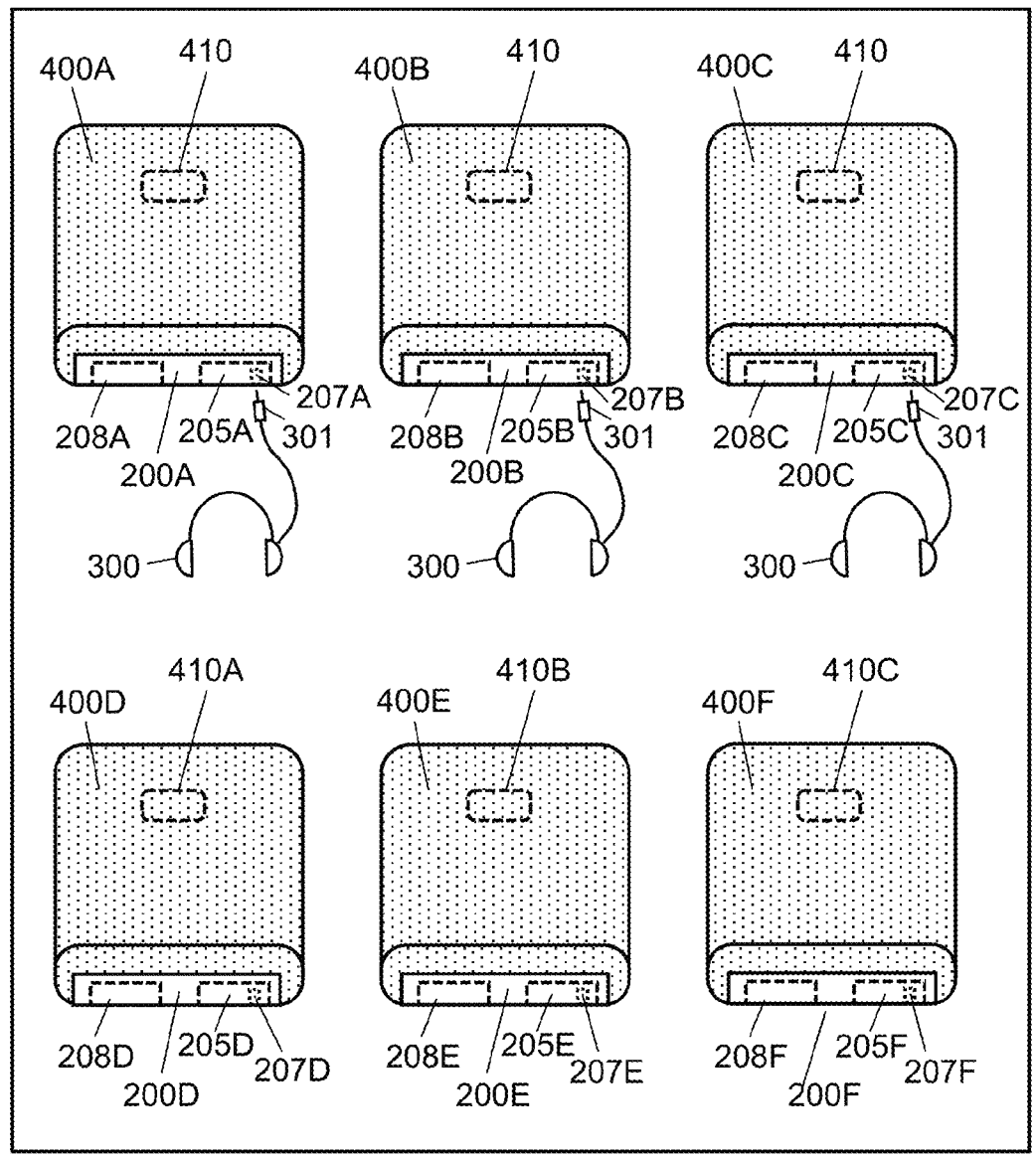
FIG. 5 is a view showing schematic arrangement of the in-flight monitors in the first exemplary embodiment.

For in-flight system 1 configured as mentioned above, the operation will be described below. FIG. 5 is a view showing schematic arrangement of in-flight monitors 200 provided within an airplane.

First, an operation of playing contents in in-flight monitor 200 will be described. In the example shown in FIG. 5, in-flight monitor 200B stops playing contents, i.e., the playing state is in "stop." At this time, the passenger who occupies seat 400E corresponding to in-flight monitor 200B, i.e., the passenger who sits down toward in-flight monitor 200B operates touch panel 204B of in-flight monitor 200B, and demands to start playing contents. Then, through touch panel 204B, CPU 202 of in-flight monitor 200B detects that the demand, which starts playing contents, has been inputted, and starts playing contents in response to this.

Specifically, CPU 202 of in-flight monitor 200B requires server 100 to deliver contents. When receiving the contents from server 100, CPU 202 starts playing contents. Concretely, CPU 202 displays image contents on display 206 of in-flight monitor 200B, and outputs audio contents to I/O interface 205B. If headphone 300 is connected to I/O interface 205B, the audio contents will be outputted from headphone 300. Further, CPU 202 sets the present playing state into "play".

On the other hand, it is assumed that in-flight monitor 200B is playing contents, i.e., the playing state is in "play". At this time, the passenger who occupies seat 400E operates touch panel 204B of in-flight monitor 200B and demands to stop playing contents. Then, CPU 202 of in-flight monitor 200B detects, through touch panel 204B, that the demand, which stops playing contents, has been inputted, and then stops playing the contents in response to this. Further, CPU 202 sets the present playing state into "stop."

CPU 202 manages playing state information that indicates the playing state of in-flight monitor 200. The playing state information is memorized in memory 203. CPU 202 acquires the playing state information from memory 203, and determines the present playing state. Further, when a playing state is changed through the above-mentioned operation, CPU 202 updates playing state information to the latest one indicating the present playing state, and memorizes it in memory 203. Further, the playing state information is transmitted to server 100 via network interface 201. The playing state information is an example of environment information.

Figure 6:
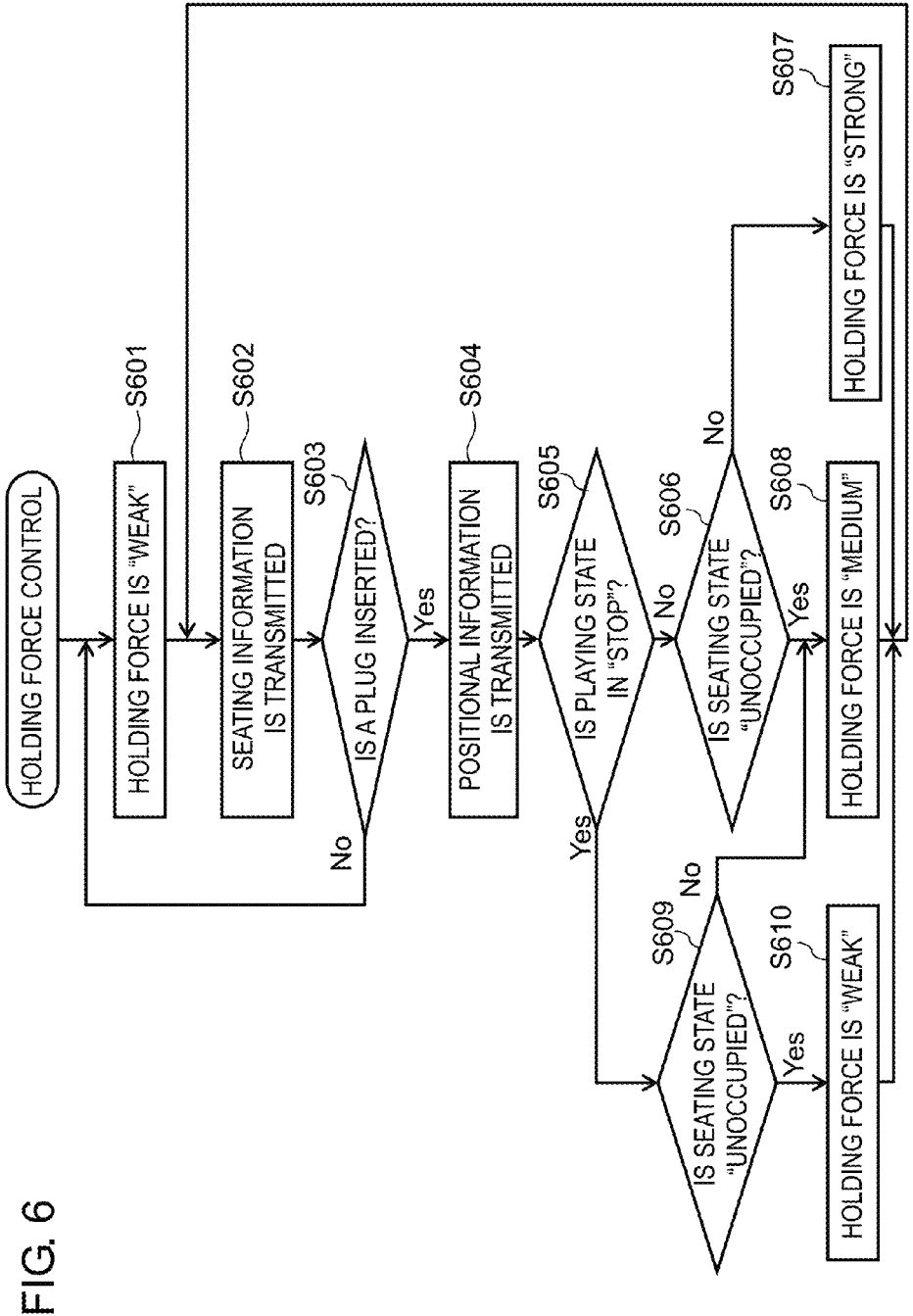
FIG. 6 is a flowchart for explaining control of holding force of a holding mechanism included in the in-flight monitor in the first exemplary embodiment.

Next, an operation of controlling holding force of holding mechanism 207 will be described. CPU 202 controls the holding force of holding mechanism 207 based on the playing state information and the seating information while playing contents. FIG. 6 is a flowchart for explaining control of the holding force of holding mechanism 207 provided in in-flight monitor 200.

When power supply of in-flight monitor 200 is switched on, CPU 202 controls holding mechanism 207 such that the holding force is turned into "weak" (S601). According to the control from CPU 202, holding mechanism 207 sets the flat spring, which serves as a holding member, at a predetermined position, and thus generates the holding force, which holds plug 301, corresponding to the "weak" stage.

CPU 202 transmits seating information, which is acquired from seat sensor 410 connected to sensor input interface 208, to server 100 via network interface 201 (S602). Server 100 stores the received seating information in data storage 104 together with information for identifying in-flight monitor 200 serving as a transmission source.

Next, CPU 202 determines whether plug 301 of headphone 300 is inserted into I/O interface 205 (S603) or not. That is, CPU 202 determines whether a detection signal has been received from I/O interface 205 or not.

When determining that the detection signal has been received (Yes in S603), CPU 202 transmits, to server 100, positional information of in-flight monitor 200 that detects the insertion of plug 301 (S604). The positional information is information indicating a position of seat 400 occupied by the passenger who is viewing in-flight monitor 200. When explained using the example shown in FIG. 5, the positional information of in-flight monitor 200A is information indicating a position of seat 400D occupied by the passenger who uses in-flight monitor 200A. Server 100 stores the received positional information in data storage 104 together with information for identifying in-flight monitor 200 serving as a transmission source. When determining that the detection signal has not been received (No in S603), CPU 202 returns back to Step S601 and repeats the processing.

Subsequently, CPU 202 controls the holding force of holding mechanism 207 based on the playing state and the seating state. Specifically, CPU 202 firstly determines whether the playing state of contents is in "stop" or not with reference to the playing state information (S605).

When the playing state is not in "stop," i.e., determining that the playing state is in "play" (No in S605), CPU 202 detects the seating state of a passenger (S606). CPU 202 determines the seating state of a passenger based on information inputted from seat sensor 410 to sensor input interface 208. That is, CPU 202 determines the seating state, i.e., whether a seat is "occupied" or "unoccupied" by a passenger based on the seating information inputted from sensor input interface 208. For instance, in the example shown in FIG. 5, by detecting the seating information from seat sensor 410B disposed in the seating section of seat 400E, CPU 202 of in-flight monitor 200B determines the seating state of a passenger, i.e., whether seat 400E is occupied or unoccupied by the passenger who sits down toward in-flight monitor 200B.

When determining that the seating state of the above-mentioned passenger is not "unoccupied" (No in S606), i.e., when determining that the playing state is in "play" and the seating state is "occupied", CPU 202 controls holding mechanism 207 such that the holding force is turned into "strong" (S607). Holding mechanism 207 generates the holding force corresponding to the "strong" stage, according to the control from CPU 202. Plug 301, which is inserted into I/O interface 205, is held by the holding force corresponding to the "strong" stage. Then, CPU 202 returns back to Step S602 and repeats the processing.

When determining that the seating state of the above-mentioned passenger is "unoccupied" (Yes in S606), i.e., when determining that the playing state is in "play" and the seating state is "unoccupied," CPU 202 controls holding mechanism 207 such that the holding force is turned into "medium" (S608). Holding mechanism 207 generates the holding power corresponding to the "medium" stage, according to the control from CPU 202. Plug 301, which is inserted into I/O interface 205, is held by the holding force corresponding to the "medium" stage. Then, CPU 202 returns back to Step S602 and repeats the processing.

Similarly, when determining that the above-mentioned image playing state is in "stop" (Yes in S605), CPU 202 detects a seating state (S609). When determining that the seating state of a passenger is not "unoccupied" (No in S609), i.e., when determining that the playing state is in "stop" and the seating state is "occupied," CPU 202 controls holding mechanism 207 such that the holding force is turned into "medium" (S608). Holding mechanism 207 generates the holding force corresponding to the "medium" stage, according to the control from CPU 202. Plug 301, which is inserted into I/O interface 205, is held by the holding force corresponding to the "medium" stage. Then, CPU 202 returns back to Step S602 and repeats the processing.

When determining that the seating state of the above-mentioned passenger is "unoccupied" (Yes in S609), i.e., when determining that the playing state is in "stop" and the seating state is "unoccupied," CPU 202 controls holding mechanism 207 such that the holding force is turned into "weak" (S610). Holding mechanism 207 generates the holding force corresponding to the "weak" stage, according to the control from CPU 202. Plug 301, which is inserted into I/O interface 205, is held by the holding force corresponding to the "weak" stage. Then, CPU 202 returns back to Step S602 and repeats the processing.

With the above-mentioned operation, CPU 202 weakens the holding power of holding mechanism 207 as the playing state of contents is changed from "play" to "stop." Further, CPU 202 weakens the holding force of holding mechanism 207 as the seating state is changed from "occupied" to "unoccupied."

[1-3 Effects]

As mentioned above, in the present exemplary embodiment, in-flight monitor 200, which can detachably connect a cable, includes I/O interface 205 to be connected to plug 301 of a cable, holding mechanism 207 for maintaining a connection state between plug 301 and I/O interface 205, and CPU 202 that acquires environment information (playing state information and seating information) around in-flight monitor 200 and changes the holding force of holding mechanism 207 based on the environment information.

Thus, in-flight monitor 200 can change the holding force of holding mechanism 207 depending on the environment information around in-flight monitor 200.

After taking such actions that a passenger stops playing contents and stands up from a seat (not occupies a seat), the passenger is likely to leave from the front of in-flight monitor 200. At this time, the passenger may pull a cable of headphone 300 accidentally, or come into contact with plug 301 that remains inserted into I/O interface 205, so that these components may be damaged.

In-flight monitor 200 in accordance with the present exemplary embodiment is allowed to weaken the holding force that holds plug 301 of headphone 300 when such actions are taken, i.e., a passenger stops playing contents and stands up from a seat (leave from a seat). Therefore, in-flight monitor 200 is effective in reducing disconnection of a cable connected to I/O interface 205, or possible breakage of plug 301 of a cable and I/O interface 205.

Other Exemplary Embodiments

As mentioned above, the above-mentioned exemplary embodiment is described as the example of the technique disclosed in this application. However, the technique in the present disclosure is not limited to this, but can also be applied to an exemplary embodiment in which modifications, substitutions, additions, omission, and the like are performed as necessary. Further, the components described in the above-mentioned exemplary embodiment each can be combined to make a new exemplary embodiment. Hereafter, other exemplary embodiments will be illustrated.

The above-mentioned exemplary embodiment describes in-flight system 1 in an airplane as an example. The in-flight system may be an in-vehicle system in transport equipment such as a super-express train and a bus.

The above-mentioned exemplary embodiment describes the configuration in which I/O interface 205 and holding mechanism 207 are included in in-flight monitor 200. To improve degrees of freedom in mounting position, I/O interface 205 and holding mechanism 207 may be a single device separated from in-flight monitor 200. In this case, I/O interface 205 and holding mechanism 207 may be disposed in seat 400 and its vicinity corresponding to in-flight monitor 200, i.e., a position at which in-flight monitor 200 can be used by a passenger. Further, in-flight monitor 200, I/O interface 205, and holding mechanism 207 may be connected via a network cable, and the holding force of holding mechanism 207 may be adjusted by CPU 202 of in-flight monitor 200.

The above-mentioned exemplary embodiment describes the configuration that connects server 100 and in-flight monitor 200 via a network cable (wired). By using a network cable, a stable connection between server 100 and each in-flight monitor 200 can be expected as an effect. However, connection means is not limited to a network cable. For instance, wireless communication may be used, or wired communication and wireless communication may be combined to connect therebetween. This increases degrees of freedom in arrangement of in-flight monitor 200. For instance, server 100 may be configured to be disposed outside an airplane and perform wireless communication.

The above-mentioned exemplary embodiment describes the configuration that employs holding mechanism 207 for mechanically holding plug 301 of headphone 300 inserted into I/O interface 205. However, means for adjusting the holding force, which holds plug 301, is not limited to holding mechanism 207. For instance, an I/O interface utilizing an electromagnet and a plug of a headphone may be used to adjust the holding force. In this case, the holding force can be adjusted by controlling electromagnetic force of the I/O interface.

The above-mentioned exemplary embodiment describes that plug 301 of headphone 300 is employed as a device held by I/O interface 205. However, an external device to be connected to I/O interface 205 is not limited to headphone 300. For instance, USB connection devices such as a USB memory, a smart phone, a tablet, and PC may be employed. In this case, the I/O interface is configured to satisfy USB standards.

The above-mentioned exemplary embodiment describes the configuration that changes holding force of holding mechanism 207 in three stages of "strong," "medium," and "weak" by detecting the playing state of contents and the seating state. The number of stages of the holding force is not limited to three. For instance, the holding force of holding mechanism 207 may be changed in only two stages of "strong" and "weak." Only when the playing state of contents is in "stop" and the seating state is "unoccupied," the holding force is turned into "weak." Further, the holding force of holding mechanism 207 may be changed in four stages or more. In this case, the holding force can be adjusted flexibly by detecting the playing state of contents and the seating state.

As shown in FIG. 2, the above-mentioned exemplary embodiment describes the case where seat sensors 410A to 410F are directly connected to sensor input interfaces 208A to 208F of in-flight monitors 200A to 200F, respectively. The seating state detected by seat sensor 410 may be transmitted to in-flight monitor 200 corresponding thereto via server 100. For instance, seat sensor 410A may be directly connected to in-flight monitor 200D of seat 400D in which seat sensor 410A is disposed. In this case, the seating information on seat 400D, which is detected by seat sensor 410A, is transmitted to server 100 via sensor input interface 208D of in-flight monitor 200D. When the seating information on seat 400D, which is detected by seat sensor 410A, is transmitted to in-flight monitor 200A from server 100, in-flight monitor 200A can acquire the seating information on seat sensor 410A.

The above-mentioned exemplary embodiment describes the configuration that controls holding force of holding mechanism 207 based on the playing state information and the seating information as the environment information. The holding force of holding mechanism 207 may be controlled based on environment information other than these. For instance, in-flight monitor 200 may employ accommodation state information indicating whether a movable object such as a tray or a handset, which is used by the passenger who occupies seat 400 corresponding thereto, is accommodated or not as environment information. Herein, the movable object is attached to the back of a backrest of seat 400, an armrest, or the like.

More specifically, an accommodation sensor detects an accommodation state of the movable object. For instance, the accommodation sensor may be constituted by a well-known photo sensor or an actuator. The accommodation sensor detects whether the movable object such as a tray is present or not in an accommodating position, thereby grasping the accommodation state of the movable object. Thus, the accommodation sensor outputs accommodation state information. The accommodation state information is inputted to sensor input interface 208 from the accommodation sensor provided in seat 400, i.e., outside in-flight monitor 200. When determining that the movable object has been accommodated (accommodation state is "accommodated") based on the accommodation state information inputted from sensor input interface 208, CPU 202 controls so as to weaken holding power of holding mechanism 207. After the movable object has been accommodated, the passenger is likely to leave from the front of in-flight monitor 200. Accordingly, the holding force is weakened as the movable object is accommodated, thereby reducing possible breakage of an external device connected to I/O interface 205.

The above-mentioned exemplary embodiment describes the configuration in which in-flight monitor 200 employs its own playing state of contents or seating information on its own seat as the environment information, and controls the holding force of holding mechanism 207 based on the above-mentioned environment information. For instance, in the example shown in FIG. 5, CPU 202 of in-flight monitor 200B controls the holding force of holding mechanism 207 in I/O interface 205B based on the playing state of contents in in-flight monitor 200B or the seating information outputted from seat sensor 410B disposed in seat 400E, which corresponds to in-flight monitor 200B. The environment information is not limited to this, but information on the other seats, for example, the next seat may be employed. That is, the environment information may be environment information on a seat assigned to a passenger different from the passenger who uses in-flight monitor 200B.

For instance, CPU 202 may control the holding force of holding mechanism 207 in I/O interface 205B based on the environment information on seat 400D next to seat 400E corresponding thereto, i.e., the playing state information of contents in in-flight monitor 200A corresponding to seat 400D, or the seating information from seat sensor 410A disposed in the seating section of seat 400D. The playing state information and the seating information on each seat 400 are transmitted to server 100 through in-flight monitor 200 corresponding thereto.

For instance, in-flight monitor 200A transmits, to server 100, the playing state information of in-flight monitor 200A and the seating information from seat sensor 410A. CPU 202 of in-flight monitor 200B acquires the playing state information and the seating information, which are transmitted by in-flight monitor 200A, from server 100. Thus, CPU 202 of in-flight monitor 200B controls holding mechanism 207 based on the environment information from in-flight monitor 200A, like the operation shown in FIG. 6.

In this way, in-flight monitor 200 may control holding mechanism 207 by acquiring the environment information on the other seats from server 100. By doing this, CPU 202 of in-flight monitor 200B can weaken the holding force of holding mechanism 207 as the passenger who occupies seat 400D next to seat 400E stops playing contents and leaves from seat 400D.

After taking such actions that the passenger who occupies seat 400D stops playing contents and stands up (unoccupied) from seat 400D, the passenger is likely to leave from the front of in-flight monitor 200A and cross the front of in-flight monitor 200B. At this time, the passenger is likely to pull out a cable of headphone 300 used by the passenger who is using in-flight monitor 200B, or come into contact with plug 301 inserted into I/O interface 205B, so that these components may be damaged. The above-mentioned configuration is allowed to weaken holding force that holds plug 301 of headphone 300 when the passenger who occupies the next seat stops playing contents, stands up (unoccupied) from the seat, or the like. Therefore, in-flight monitor 200 is effective in reducing disconnection of a cable connected to I/O interface 205, or possible breakage of plug 301 of a cable and I/O interface 205.

The above-mentioned exemplary embodiment describes the configuration in which in-flight monitor 200 controls holding force of holding mechanism 207 based on the playing state information and the seating information. The holding force of holding mechanism 207 may be controlled depending on a connection state between plug 301 and I/O interface 205 of another in-flight monitor 200. In-flight monitor 200 transmits, to server 100, connection information indicating whether or not plug 301 is connected to I/O interface 205. Further, CPU 202 of in-flight monitor 200 receives connection information on another in-flight monitor 200 from server 100. Then, CPU 202 weakens holding force of holding mechanism 207 as plug 301 is pulled out (the connection state is released) from another in-flight monitor 200.

After taking such an action that plug 301 is pulled out from I/O interface 205, the passenger is likely to leave from the front of in-flight monitor 200 and move. At this time, the passenger is likely to pull out a cable of headphone 300 used by the passenger who is using another in-flight monitor 200, or come into contact with plug 301 inserted into I/O interface 205, so that these components may be damaged. The above-mentioned configuration is allowed to weaken holding force of plug 301 of headphone 300 as the passenger who occupies the next seat pulls out plug 301. Therefore, in-flight monitor 200 is effective in reducing disconnection of a cable connected to I/O interface 205, or possible breakage of plug 301 of a cable and I/O interface 205.

In the above-mentioned exemplary embodiment, the seating state of seat 400 is detected by seat sensor 410, but the seating state may be detected by using a camera (imaging device) included in in-flight monitor 200. The camera takes a picture of the seat facing in-flight monitor 200 equipped with the camera. In this case, CPU 202 of in-flight monitor 200 analyzes image data taken by the camera and determines a seating state of a passenger who occupies a seat facing in-flight monitor 200. This makes it possible to eliminate seat sensor 410 disposed in seat 400. Therefore, the present exemplary embodiment is useful in the case where the seat sensor is difficult to be disposed in a seat, or passengers feel uncomfortableness when the seat sensor is disposed.

The exemplary embodiments are described above as the examples of the technique in the present disclosure. For this purpose, the accompanying drawings and the detailed description are provided.

Therefore, the components described in the accompanying drawings and the detailed description may include not only components essential for solving the problem but also components that are not essential for solving the problem in order to illustrate the technique. Therefore, even when the unessential components are described in the accompanying drawings and the detailed description, they do not have to be recognized as being essential.

Further, since the above exemplary embodiments illustrate the technique in the present disclosure, various modifications, substitutions, additions and omission can be performed within the scope of claims and equivalent scope of claims.

INDUSTRIAL APPLICABILITY

The connection device in the disclosure is effective in reducing disconnection of a cable and possible breakage of a connector, and applicable to an in-vehicle system in an airplane, a train, or the like.

What is claimed is:

1. A connection device capable of detachably connecting a cable, the connection device comprising:
 a first terminal to be connected to a second terminal of the cable;
 a holding mechanism for maintaining a connection state between the first terminal and the second terminal; and
 a controller that acquires environment information around the connection device, which includes a playing state indicating whether or not an image or an audio sound is played in the connection device, and changes holding force of the holding mechanism according to a change of the playing state.

2. The connection device according to claim 1, wherein the controller changes the holding force of the holding mechanism in at least three stages based on the environment information.

3. The connection device according to claim 1, wherein the controller reduces the holding force of the holding mechanism when a currently played image or audio sound stops.

4. The connection device according to claim 1, wherein the environment information includes seating information indicating whether a seat assigned to a passenger using the connection device is occupied or not.

5. The connection device according to claim 4, wherein the controller reduces the holding force of the holding mechanism when the seat is unoccupied.

6. The connection device according to claim 1, wherein the environment information includes accommodation state information indicating whether a movable object corresponding to the connection device is accommodated or not.

7. The connection device according to claim 6, wherein the controller reduces the holding force of the holding mechanism when the movable object is accommodated.

8. The connection device according to claim 1, wherein the environment information includes another playing state information indicating whether or not an image or an audio sound is played in another connection device different from the connection device.

9. The connection device according to claim 8, wherein the controller reduces the holding force of the holding mechanism when a currently played image or audio sound stops at the another connection device.

10. The connection device according to claim 1, wherein the environment information includes seating information indicating whether a seat assigned to a passenger different from a passenger using the connection device is occupied or not.

11. The connection device according to claim 10, wherein the controller reduces the holding force of the holding mechanism when the seat is unoccupied.

12. The connection device according to claim 1, wherein the environment information includes accommodation state information indicating whether a movable object corresponding to another connection device different from the connection device is accommodated or not.

13. The connection device according to claim 12, wherein the controller reduces the holding force of the holding mechanism when the movable object is accommodated.

14. The connection device according to claim 1, wherein the environment information includes connection information indicating whether an external device to be connected to another connection device different from the connection device is connected or not.

15. The connection device according to claim 14, wherein the controller reduces the holding force of the holding mechanism when the external device is not connected.

* * * * *